3,067,505
ROLLING PROCESS TO MAKE SINTERED ELECTRODE MATERIAL FLEXIBLE
Raymond L. Schenk, Jr., Minneapolis, Minn., assignor to Union Carbide Corporation, a corporation of New York
No Drawing. Filed Nov. 19, 1958, Ser. No. 774,817
4 Claims. (Cl. 29—420.5)

This invention relates to a method of making flexible sintered electrode material, such as used in nickel-cadmium cells for example. More particularly, the invention relates to a method which will permit electrode material, which comprises an apertured electrically conductive support web having a coherent layer of finely divided material adherent thereto, to be cylindrically shaped.

The conventional method of manufacturing flat sintered electrochemically active plaques for use as electrodes comprises providing an electrode blank which was manufactured by providing on an electrically conductive support web, generally on both sides of a flat nickel screen, a layer of fine nickel powder; heating the blank in a reducing atmosphere until the nickel particles are caused to sinter and to adhere to one another and to the nickle screen, the latter acting to add strength to the finish electrodes and to reduce contraction during sintering, and subsequently placing the electrode blank in condition for use as an electrode by impregnating it with an electrochemically active material or one that may be converted to such a material, as for example for plaques for use in nickel-cadmium cells, by impregnating the electrode blank with a salt of cadmium or nickel, preferably the nitrate, and coverting the nitrate to the oxide or hydroxide.

The above method may be modified by providing a powdered layer of electrochemically active electrode material directly to the electrically conductive support web, followed by heating in a reducing atmosphere to cause the particles to sinter and to adhere to one another and to the support web.

In the production of cells having electrodes of the above described type, a problem is encountered if the electrodes have to be bent into shapes other than flat. The problem is particularly acute in small diameter cylindrical cells, such as nickel-cadmium cells of the AA size as defined in circular C-466 of the National Bureau of Standards of the United States Department of Commerce.

The problem arises because it is desirable to impregnate the electrode blank in sheet form rather than as shaped individual blanks, but until now this procedure has been unsatisfactory for the electrode blank is generally brittle, and when it is bent into a cylindrical shape the sintered nickel powder has a tendency to break away from the screen carrying with it any impregnated material.

Accordingly, the principal object of the invention is to provide a method of making sintered electrode material flexible so that it may be satisfactorily shaped.

Broadly stated, this object is accomplished by the method of the invention, which is based upon the discovery that electrode blanks may be bent into a cylindrical shape having a relatively small radius without any of the sintered powder breaking away from the support web if, prior to being shaped, the electrode blank is first compressed and slightly elongated by being subjected to a rolling pressure.

More particularly, the invention comprises running screen supported sintered electrode blanks, which are impregnated with a salt of cadmium or nickel, or the oxide or hydroxide of cadmium or nickel and suitable for use as electrodes in nickel-cadmium cells between rollers which thin and elongate the electrode blanks slightly. The brittle, porous sintered nickel powder is cracked across the direction of rolling into uniformly sized small segments by the rollers and these segments are hinged together by the screen. The thus rolled electrode blank may then be bent or shaped without the coherent materials being broken off. In the practice of the invention it is immaterial whether the rolling operation preceeds or follows the conversion of the salt to the appropriate oxide or hydroxide.

The method of the invention is suitable to a wide range of electrode thickness. For example, it has been practiced successfully with electrodes as thin as .025 inch and as thick as .150 inch.

Furthermore, a cylindrical shape of much smaller radius than that of the rollers is no problem, for example, an electrode blank initially .050 inch thick rolled to a .048 inch thickness between three inch diameter rollers can be bent into a .500 inch diameter cylinder for use in size AA cells without any difficulty.

For best results in the practice of the invention, that is, in order to obtain the maximum degree of bendability after rolling, the electrode blank should be made with the support web so located within the electrode blank that a thicker layer of porous sintered nickel rests on one side of the support web than on the other. After rolling, the direction of bending which is applied to form a cylinder, is selected so that the thicker layer of porous sintered nickel is located on the outer surface of the cylinder.

The practice of this invention is not limited to rolling of porous sintered nickel blanks which are supported on wire screen material. Other flexible apertured sheet-like material such as expanded metal mesh and perforated metal sheet can also be used effectively as a support.

It has also been found that when wire screen is used as a support that rolling need not be limited to any particular direction of orientation with respect to the direction of the wire comprising the screen. Equally good results are obtained whether the electrode blank be rolled in a direction parallel to the mesh of the screen or in a direction diagonal to the mesh. If the electrode blank is rolled diagonally the uniformly spaced cracks which appear as parallel cracks in the surface when the electrode blank is bent, continue to be oriented in a direction at ninety degrees to the direction of rolling.

The rollers used for the compressing, elongating and cracking of the brittle electrode blank may be either ribbed or flat. Ribbed rollers will compress the material somewhat more and will give more exactly spaced cracks.

What is claimed is:
1. In the manufacture of electrodes for galvanic cells, which electrodes consist of an electrode blank comprising an apertured, electrically conductive support web chosen from the group consisting of metallic screen, expanded metallic mesh, and perforated metallic sheet, and a layer of sintered, coherent, initially finely-divided electrochemically active electrode material adherent thereto, said layer having a tendency to separate from said support web when said structure is deformed, the improvement which comprises applying rolling pressure to said blank to compress and slightly elongate the same thus effecting cracking of said layer in a direction parallel to the line of contact between said blank and said rolling pressure means without causing it to separate from said supporting web, thereby rendering said structure flexible for bending to desired configurations.

2. In the manufacture of electrodes for galvanic cells, which electrodes consist of an electrode blank comprising an apertured electrically conductive support web, said support web being chosen from the group consisting of nickel screen, expanded nickel mesh and perforated nickel sheet, and a layer of coherent, initially finely-divided electrochemically active electrode material adherent thereto said material being sintered nickel powder having impregnated within it a material chosen from the group which consists of nickel nitrate, cadmium nitrate, nickel oxide, cadmium oxide, nickel hydroxide, and cadmium hydroxide, said layer having a tendency to separate from said support web when said structure is deformed, the improvement which comprises applying rolling pressure to said blank to compress and slightly elongate the same thus effecting cracking of said layer in a direction parallel to the line of contact between said blank and said rolling pressure means without causing it to separate from said supporting web, thereby rendering said structure flexible for bending to desired configurations.

3. The method of claim 2 wherein said rolling pressure is applied to said electrode blank by passing said electrode blank between opposed flat surfaced rollers.

4. The method of claim 2 wherein said rolling pressure is applied to said electrode blank by passing said electrode blank between opposed ribbed surfaced rollers.

References Cited in the file of this patent

UNITED STATES PATENTS

| | | |
|---|---|---|
| 237,221 | Westervelt | Feb. 1, 1881 |
| 1,854,021 | Derby | Apr. 12, 1932 |
| 2,284,254 | Batcheller | May 26, 1942 |
| 2,289,339 | Brennan | July 14, 1942 |
| 2,299,877 | Calkins | Oct. 27, 1942 |
| 2,596,284 | Peters | May 13, 1952 |
| 2,596,285 | Peters | May 13, 1952 |
| 2,650,888 | Pottberg | Sept. 1, 1953 |
| 2,672,495 | Fleischer | Mar. 16, 1954 |
| 2,673,480 | Wellman | Mar. 30, 1954 |
| 2,719,355 | Diffenderfer | Oct. 4, 1955 |